Patented Dec. 9, 1947

2,432,301

UNITED STATES PATENT OFFICE 2,432,301

CONVERSION OF HYDROSULFIDES TO NEUTRAL SULFUR COMPOUNDS

Lloyd C. Fetterly, Long Beach, Calif., assignor to Shell Development Company, San Francisco, Calif., a corporation of Delaware No Drawing. Application June 26, 1944, Serial No. 542,257

9 Claims. (Cl. 23—184)

This invention relates to the oxidation of sulfhydryl or hydrosulfides, i. e. $H_2S$ and mercaptans, including both aliphatic mercaptans and thiophenols, to neutral sulfur substances, i. e. free sulfur and organic disulfides. More particularly, it deals with employing certain indigo compounds as catalysts for this oxidation.

The oxidation of hydrosulfides has particular application in the regeneration of alkaline solutions employed for treating sour hydrocarbons whereby hydrosulfides are extracted by the alkaline solution and then are oxidized (such as by air blowing) to form neutral sulfur substances. These neutral substances are then removed so that the alkaline solution may be used again to extract more hydrosulfides from more sour hydrocarbon distillates.

It is a purpose of this invention to simply, efficiently and economically oxidize hydrosulfides to neutral sulphur substances. Another purpose is to simply, efficiently and economically regenerate by oxidation alkaline solutions employed in treating sour hydrocarbon distillates. Still another purpose is to speed up such oxidation reactions with a small amount of an active and stable oxidation catalyst. Further incidental purposes are: to increase the lead susceptibility of gasoline treated with alkaline solutions regenerated by the process of this invention; to lower the mercaptan sulfur content of gasolines so treated; to increase the solubility of mercaptans in such alkaline treating solutions; etc.

Generally speaking, the process of this invention comprises carrying out the oxidation of hydrosulfides to neutral sulfur substances in the presence of a small amount of an oxidation catalyst comprising a water soluble indigo, such as sodium indigo disulfonate.

A specific embodiment of the process may comprise the steps of (1) extracting hydrogen sulfide and/or mercaptans from hydrocarbon mixtures containing them with an aqueous alkaline solution, which may or may not contain a solutizer (solubility promoter) for said hydrogen sulfide and mercaptans; (2) separating the resulting aqueous alkaline solution phase containing dissolved hydrosulfides; (3) treating it with an oxidizing agent in the presence of one of said abovementioned indigo catalysts to precipitate neutral sulfur substances, such as free sulfur and/or organic disulfides; (4) removing these precipitated neutral sulfur compounds; and (5) recycling the resulting regenerated aqueous alkaline solution for extracting more hydrosulfides from more hydrocarbons.

Hydrosulfides may be derived from any natural or synthetic source. Thus, petroleum or coal tar fluids, such as natural or coke oven gases, natural gasolines, gasolines, kerosene, etc., both straight run and cracked, usually contain hydrogen sulfide and/or mercaptans.

The oxidation of hydrosulfides is carried out in an alkaline solution and therefore at least part of the hydrosulfides are in the form of their metal sulfides or mercaptides.

Various alkaline treating solutions may be employed. If hydrogen sulfide is to be oxidized, the alkaline treating solution may comprise alkali or alkali earth metal hydroxides, phosphates, carbonates, phenolates, borates, arsenates, organic amines such as alkanol amines or alkylene diamines, piperidine, piperazine, diazine, pyridines, quinolines, picolines, etc. If mercaptans are to be oxidized, the alkaline treating solution may comprise aqueous alkali metal hydroxide solutions which may or may not contain solutizers for mercaptans. Solutizers promote the solubility of the hydrosulfides in aqueous alkaline solutions. Some suitable solutizers are lower alkyl mono and poly hydroxides, lower aliphatic polyamines, alkanol amines, hydroxy or amino ethers, fatty acids of 2 to 6 carbon atoms, naphthenes and carboxylic acids of 5 to 11 carbon atoms, phenols containing up to 15 carbon atoms, etc. The preferred solutizers are phenols and fatty acids containing from 3 to 5 carbon atoms.

Oxidizing agents suitable for converting hydrosulfides to neutral sulfur materials include peroxides, permanganates, manganese dioxide, hypochlorites, oxygen, air (preferably free of carbon dioxide), etc. Air blowing at temperatures between about 60° F. and 200° F. and preferably not above 150° F. has been found to be a satisfactory method for oxidizing hydrosulfides. The pressure is usually atmospheric, but higher or lower pressures may also be employed, if desired.

Neutral sulfur substances formed by oxidation include free sulfur (oxidized from hydrogen sulfides) and organic disulfides (oxidized from mercaptans and mercaptides) forming solid or liquid precipitates in aqueous alkaline solutions. These precipitates are easily removed by decantation, settling or filtering. The rate of settling of the sulfur materials in aqueous spent alkaline solutions may be increased by dilution. In certain alkaline solutions (such as solutizer solutions) having a high content of organic constituents, organic disulfides may be fairly soluble and may have to be extracted with suitable solvents, such as hydrocarbon liquids.

The particular oxidation catalysts of this invention are water-soluble indigo compounds which may be represented by the class formulae:

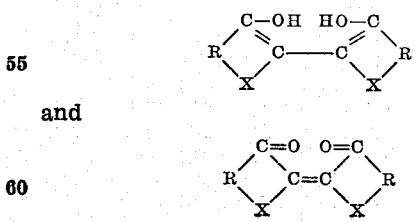

and wherein R is an aromatic ring (which may be isocyclic or heterocyclic) such as benzene, naphthalene, pyridine, quinoline, etc., condensed with the heterocyclic rings shown and X is a radical or an atom such as O, S, Se, NH, SO, $SO_2$, $CH_2$, CH=CH, etc. The aromatic type ring is preferably substituted with a radical, preferably an acid radical, which makes the compound at least partially soluble in aqueous alkaline solutions. Preferred radicals are carboxyl or sulfonic acid; others comprise hydroxy, amino, nitro radicals, etc. Additional radicals such as halogen, alkyl, etc., may be substituted on the aromatic ring.

Some suitable catalysts are mono and disulfonic acids of indigo or of leuco indigo; of indirubin, thio-indigo, 6,6'dibromoindigo, 5,7,5'tribromoindigo, 5,5', 7,7' tetrabromoindigo, pentabromoindigo, thio-indigo scarlet R, ciba scarlet, thionaphthene-indolindigo, ciba violet B, ciba violet 3B, naphthalene-indolindigo, alizanin-indigo 3R, 4,4'-dimethyl-6,6'-dichlorothioindigo, oxindigo, selenindigo, and the reaction products of isatin-alpha-anilide or isatin chloride with thioindoxyl, phenols, naphthols, anthranols, etc.

Many indigos have 3 oxidation stages: leuco indigo, indigo proper, and dehydroindigo. These can be converted into each other by oxidation and reduction respectively. This reactivity accounts for the effectiveness of these compounds as oxidation catalysts. Some indigos as thioindigo have only two stages, there being no dehydro form. However, two stages are sufficient for catalytic activity.

The amount of catalyst employed may vary between about .1% and 5% by weight, and preferably between .5% and 3% by weight) of the solution to be oxidized containing the hydrosulfides. Within the above limits greater amounts of catalyst produce faster oxidation of the hydrosulfides for any given solution. It is usually desired to control the oxidation of the hydrosulfides in the solution so that between about .1% and 1% by weight of hydrosulfides will remain unoxidized in order to insure against the oxidation of the catalyst. Either mercaptans or hydrogen sulfide, or both, may be used for the protection of the catalyst.

While the catalysts of this invention are highly effective, yet they are quite resistant to deterioration by oxidation.

As long as there is a substantial amount of mercaptan sulfur or inorganic sulfide sulfur in the aqueous treating solution, the bulk of the catalyst will not be permanently oxidized. However, when the content of this type of sulfur drops very low the catalyst begins to oxidize. To prevent this, a protective amount of this type of sulfur should be left in the treating solution, the minimum protective amount varying with the nature of the catalyst. A catalyst which is easily oxidised requires a relatively large amount of this type of sulfur while a more stable catalyst is effectively protected with a smaller amount. The catalysts of this invention require in general not more than about .1% to .2% mercaptan sulfur to protect them.

Residual mercaptan sulfur in the regenerated treating solution controls its so-called re-entry value, that is the amount of mercaptan that is introduced into a hydrocarbon distillate by contacting it with the regenerated treating solution. If the re-entry value is too high the hydrocarbon distillate cannot be sweetened by extraction with regenerated solution. Hence, it is important that the residual mercaptan sulfur content and its consequent re-entry value be as low as possible.

The relatively high stability of the catalysts of this invention makes possible a very low re-entry value.

The following specific example illustrates this invention:

A sodium hydroxide solution that was spent in treating gasoline and containing .67% by weight of sodium hydroxide, .60% by weight of sulfide sulfur, and .77% by weight of mercaptan sulfur, was admixed with .1% by weight of sodium indigo disulfonate and air blown at 80° F. for one hour. The resulting blown solution contained .50% by weight of sulfide sulfur, and .001% by weight of mercaptan sulfur.

There are many advantages attained by using catalysts of the type disclosed herein for the regeneration of the described spent alkaline treating solutions. Some of these advantages include high activity, and high stability of the catalyst which, in turn, produces efficient oxidation of the hydrosulfides at relatively low temperatures, thus reducing the amount of heat required, if any, and reducing the amount of corrosion of the apparatus. Since the process is simple, efficient and easily carried out, the capital cost of the apparatus and the amount of chemicals needed to run it are comparatively low. Another advantage is that the described catalysts themselves are solutizers for mercaptans.

I claim as my invention:

1. In a process for regenerating a spent aqueous alkaline solution containing hydrosulfides extracted from sour hydrocarbons, the improvement comprising contacting said spent solution with an oxygen-containing oxidizing agent for said hydrosulfides in the presence of a small amount of an indigo compound containing an aromatic ring which is substituted with a polar water-solubilizing radical.

2. The process of claim 1 wherein said hydrosulfides comprise hydrogensulfide.

3. The process of claim 1 wherein said hydrosulfides comprise mercaptans.

4. The process of claim 1 wherein said oxidizing agent is an oxygen-containing gas.

5. The process of claim 1 wherein said oxidizing agent is air.

6. The process of claim 1 wherein said indigo compound is an indigo sulfonate.

7. The process of claim 1 wherein said alkaline solution is an aqueous solution of an alkali metal compound and said catalyst is dissolved therein.

8. The process of claim 1 wherein the amount of said catalyst is between 0.1% and 5% by weight of said solution.

9. The process of claim 1 wherein the amount of said catalyst is between 0.5% and 3% by weight of said solution.

LLOYD C. FETTERLY.

REFERENCES CITED

The following references are of record in the file of this patent:

UNITED STATES PATENTS

| Number | Name | Date |
|---|---|---|
| 1,998,863 | Chaney et al. | Apr. 23, 1935 |
| 2,315,530 | Loyd | Apr. 6, 1943 |
| 2,316,092 | Loyd | Apr. 6, 1943 |
| 2,001,715 | Fischer | May 21, 1935 |
| 2,080,654 | Craig | May 18, 1937 |
| 2,152,721 | Yarbroff | Apr. 4, 1939 |
| 1,943,744 | Rosenstein | Jan. 16, 1934 |
| 2,369,771 | Bond | Feb. 20, 1945 |